United States Patent [19]

Hession et al.

[11] 4,281,464
[45] Aug. 4, 1981

[54] DEVICE TO FACILITATE THE LAYING OF MASONRY UNITS

[75] Inventors: Rodney J. Hession; Brent M. Hession, both of New Orleans, La.

[73] Assignee: Hession Industries, Inc., New Orleans, La.

[21] Appl. No.: 113,324

[22] Filed: Jan. 18, 1980

[51] Int. Cl.³ .............................................. G01C 15/10
[52] U.S. Cl. .................................................. 33/408
[58] Field of Search ............... 33/405, 404, 410, 406, 33/408; 52/105, 364, 365, 747, 749, 750

[56] References Cited

U.S. PATENT DOCUMENTS

| 1,054,635 | 2/1913 | Cagnassi | 52/749 |
| 1,092,058 | 3/1914 | Knott et al. | 33/410 |
| 2,629,177 | 2/1953 | Zinken | 33/410 |

FOREIGN PATENT DOCUMENTS

| 746912 | 3/1933 | France | 52/749 |
| 971103 | 6/1950 | France | 52/749 |

Primary Examiner—Harry N. Haroian
Attorney, Agent, or Firm—Kemon & Estabrook

[57] ABSTRACT

A device providing a guide to facilitate the laying of masonry units having side faces and a top surface to form a wall or the like. The device includes a plurality of clamping members for engaging the side faces of masonry units of a previously laid row or course with said clamping members providing a support for a rigid guide unit. The guide unit constitutes a straight edge against which masonry units may be positioned during the laying of a row or course of said units, whereby said units will be flush and level throughout said row or course, and in vertical alignment with the units of previously laid courses or rows.

9 Claims, 6 Drawing Figures

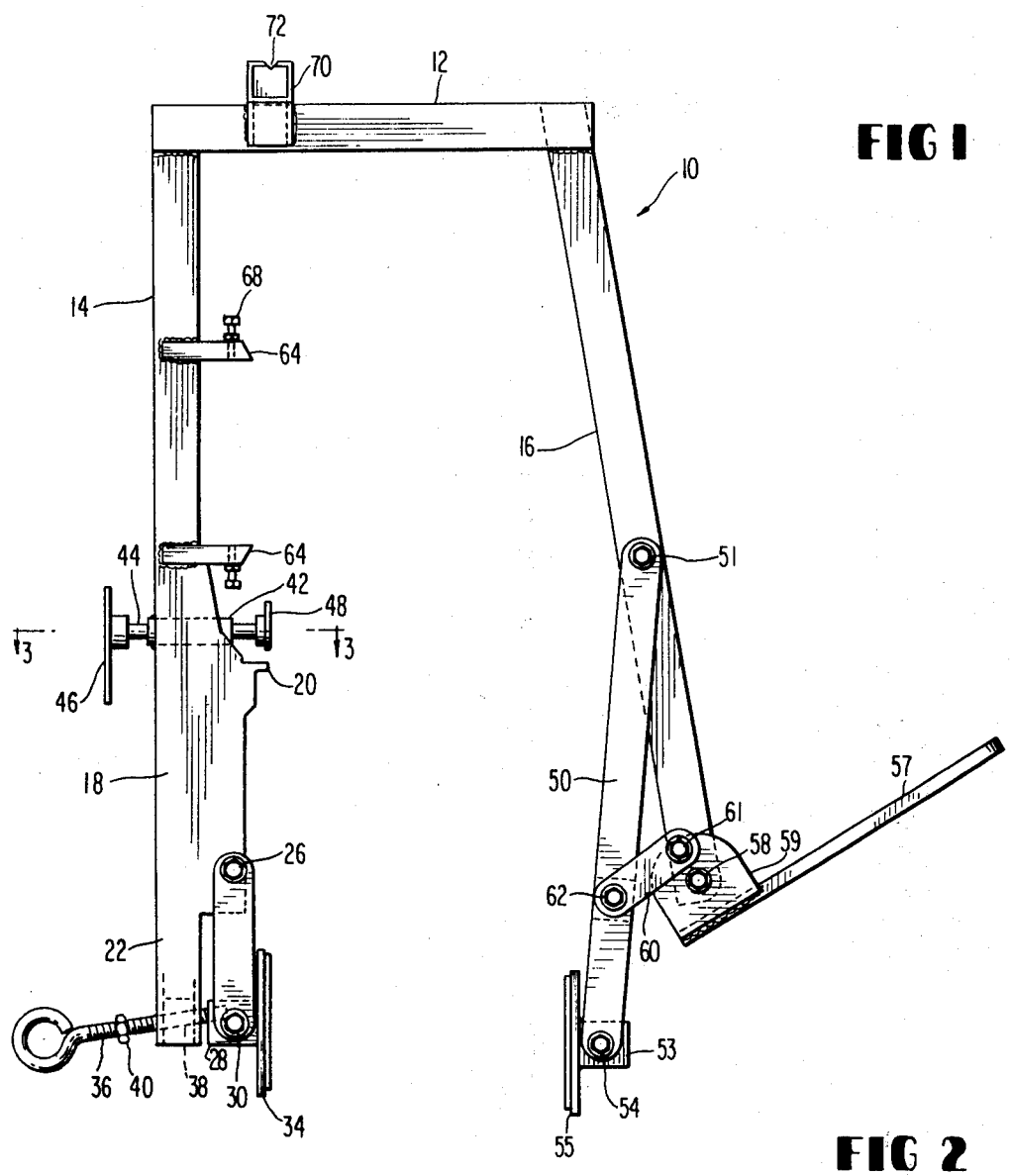
FIG 1
FIG 2
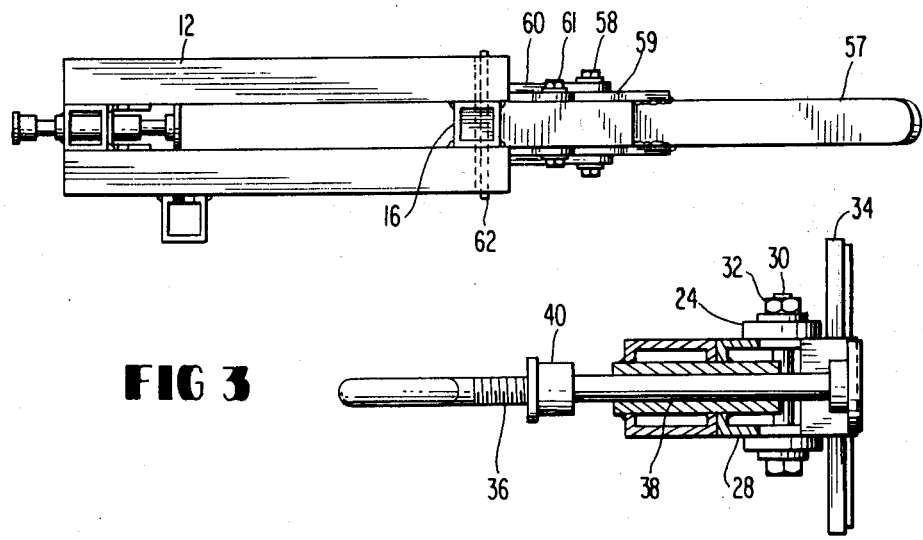
FIG 3

DEVICE TO FACILITATE THE LAYING OF MASONRY UNITS

BACKGROUND OF THE INVENTION

The present invention is directed to geometrical instruments of the straight edge type, and more specifically, to wall guides and plumbs.

In the fabrication of a masonry wall or the like, the laying of a row or course of bricks or blocks upon a previously laid row is a repetitious operation. It is essential that the bricks or blocks of each row be in proper arrangement with one another, as well as with those in previously laid rows or courses to maintain proper alignment, both horizontally and vertically. While the disposal of mortar between the various rows or courses of bricks is important, the proper alignment of a row or course of bricks or blocks with previous rows or courses is of greater importance, both from a sound structural standpoint, as well as from the asthetic standpoint. Thus, the laying of bricks or blocks into a wall is carried out by a skilled artisan who usually employs a plumb bob and a spirit or bubble level in aligning a row or course of bricks with previous rows or courses.

The prior art that is known relative to brick or block laying devices is shown in U.S. Pat. Nos. 966,801 dated Aug. 9, 1910 to J. Daisley; 2,585,283 dated Feb. 12, 1952 to P. H. Sommers and 3,111,764 dated Nov. 26, 1963 to C. C. Mayes. The builders apparatus shown in the U.S. patent to Daisley, No. 966,804, is directed to a form that is similar to a building scaffold with the vertical uprights of said form being anchored to the floor of the building or structure by suitable cables. As the height of the building increases, the form may be elevated by adding an additional vertical support with suitable braces. In addition, adjustably mounted arms are secured to said vertical supports, and said arms have slots in the outer ends to receive a plurality of bars arranged in a crib manner. The bars constitute guide means for the laying of the rows or courses of bricks and being of rigid nature, the bricks or blocks can be placed against said bars to insure that they are properly positioned in both a horizontal and vertical manner.

The patent to Mayes, 3,111,764, is in many respects, similar to Daisley, 966,801, in that it is directed to a scaffold type of structure used in erecting brick walls or facings on a building. In the Mayes structure, the scaffold devices are suspended from the top of the building by cables and said scaffolds are elevated by a suitable crank operated winder. A plurality of vertically disposed tubular rods are carried by the scaffold structure and said rods have guide elements constituting straight edge members against which a row or course of bricks may be laid to insure proper positioning and alignment.

The patent to Sommers, 2,585,283, is directed to a hand manipulated straight edge type of device for laying of bricks or cement blocks. The Sommers device is supported on bricks or blocks that have been previously laid to facilitate the laying of the next or subsequent row or course of bricks or blocks. The Sommers device or tool embodies a thin, elongated metallic member of sufficient rigidity to act as a straight edge against which bricks or blocks may be positioned during the laying of a row or course of bricks. The metallic member terminates at each end in handle members arranged normal to the longitudinal axis of said metallic member. The handle members are capable of being adjusted to enable said device to be used on bricks or blocks of different sizes. The handles are adapted to engage bricks laid in a previous row, so as to properly position the straight edge portion of the device whereby another row or course of bricks may be properly laid. However, in the Sommers device, a portion of each row or course of bricks or blocks must be laid without the use of the laying device before said device can be employed in the laying of the remaining bricks or blocks of that particular row.

SUMMARY OF THE INVENTION

The present invention is directed to a block or brick laying guide unit that is mounted in a plurality of rigid frame or supporting members each of which is provided with adjustable clamping elements arranged to engage the masonry units of a previously laid row of bricks or blocks.

The rigid frame or supporting member includes a top section having a pair of depending legs rigidly secured thereto. One of said legs is disposed in a plane normal to the top section while the other leg is arranged to have an obtuse angle with the top section. Each leg has pivotally mounted, on the free end thereof, an adjustable clamping element for engaging the masonry units of a previously laid row of bricks or blocks. The leg of the frame or supporting member normal to the top section is provided with a pair of rigid supports for receiving an elongated guide unit against which bricks or blocks are laid for properly positioning and aligning same with respect to blocks in previously laid rows or courses.

DESCRIPTION OF THE DRAWING

FIG. 1 is a side elevational view of the supporting clamping member without the brick laying guide of the present invention;

FIG. 2 is a top plan view of the supporting member shown in FIG. 1;

FIG. 3 is a detailed sectional view of the adjustable clamping member provided on the free end of the leg that is normal to the top of the clamping member, the view being taken on the line 3—3 of FIG. 1;

DESCRIPTION OF THE PREFERRED EMBODIMENTS

Figure 5:
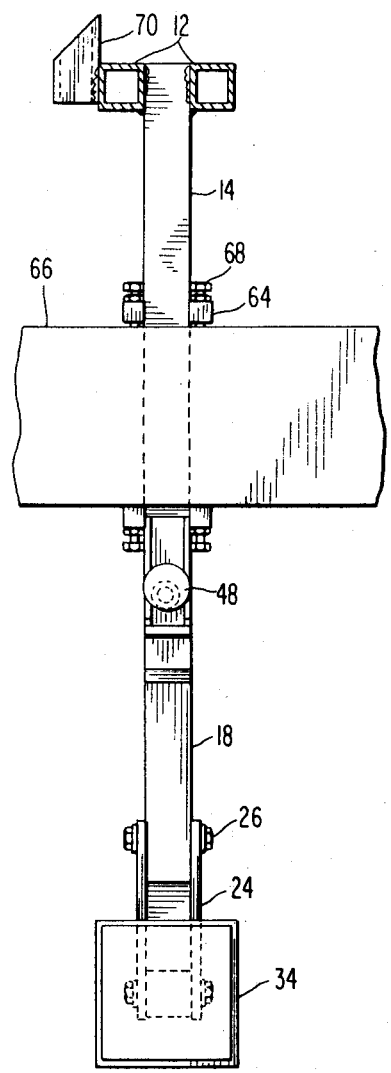
FIG. 5 is a vertical sectional view showing the guide unit mounted upon the leg of the supporting member.

Referring to the drawing, there is shown in FIG. 1, a rigid frame or supporting unit 10, that includes a top section 12 having a pair of depending legs 14 and 16. The frame or supporting unit 10 is preferably formed from a suitable lightweight metal, such as aluminum, and in order to provide sufficient rigidity, the top and leg elements are of box-like configuration in cross section. The top section 12 is formed from two elongated segments of square configuration, FIG. 5, that are spaced apart a sufficient distance to receive therebetween the depending legs 14 and 16, which are also of square configuration. The leg 14 is secured between the two elements of the top 12 by any suitable means such as welding, brazing or the like, so as to provide a rigid structure, and said leg is disposed at a 90° angle, with respect to the horizontal axis of the top 12. The depending leg 16 is also secured between the two elements of the top 12 in the same manner as the leg 14. However, the leg 16 is disposed at an obtuse angle with respect to the top 12 in the manner as shown in FIG. 1.

The leg 14 is formed with an enlarged lower portion 18, that is of box-like configuration, and said portion is provided at its upper end with a protuberance or lip 20. The lower end of the enlarged portion 18 terminates in a reduced end portion 22, which in cross section is approximately the same size as the upper portion of the leg 14. The reduced end portion 22 has arranged therewith in spaced parallel relation, a pair of depending segments 24, which are pivotally connected to the lower end of portion 18 by means of a suitable pin 26. The lower end of the segments 24 are pivotally connected to a boss 28 by a thread bolt 30 that is provided with a nut 32, FIG. 3. The boss 28 is formed on the outer face of a shoe or pad element 34. The shoe or pad element 34 is capable of an arcuate movement by means of the pivotal connection of the segments 24 with the boss 28 and the lower end of the portion 18. The movement of the shoe or pad element 34 is carried out by means of a threaded rod 36 that engages a threaded internal passage 38 formed in the reduced end portion 22 of the leg 14 and which projects through a threaded aperture in the boss 28. The rotation of the rod 36 will cause the show or pad element 34 to move either towards or away from the reduced end portion 22 of the leg 14 and a movement limiting nut 40 is mounted on and carried by said rod 36.

The leg 14, superjacent the protuberance or lip 20, is formed with a suitable aperture that has a tubular sleeve 42 press fitted therein. The sleeve 42 has a rod 44 slidably mounted therein with an enlarged handle 46 provided on one end of said rod and a washer 48 rigidly secured in an offset manner to the other end of the rod 44. The washer 48 is capable of being rotated by the handle 46 and also moved towards or away from the leg 14 by means of the handle 46 and rod 44. The washer 48 is adapted to engage the upper surface of a block in the last laid row or course for properly positioning the unit 10 on said row of blocks.

The leg 16 at a point slightly below its center, has a pair of segments or arms 50 pivotally connected thereto by a rod 51. The lower end of the arms 50 are pivotally connected to a boss 53 by means of a pin 54 with the boss being formed on the outer or rear fare of a shoe or pad element 55. The lower end of the leg 16 has a lever 57 pivotally connected thereto by means of a rod 58 extending through wing elements 59 formed on the end of the lever 52. The wing elements 59 are pivotally connected to the arms 50 by means of links 60, that are attached to the wing elements 59 by pins 61, and to the arms 50 by pintles 62.

Figure 4:
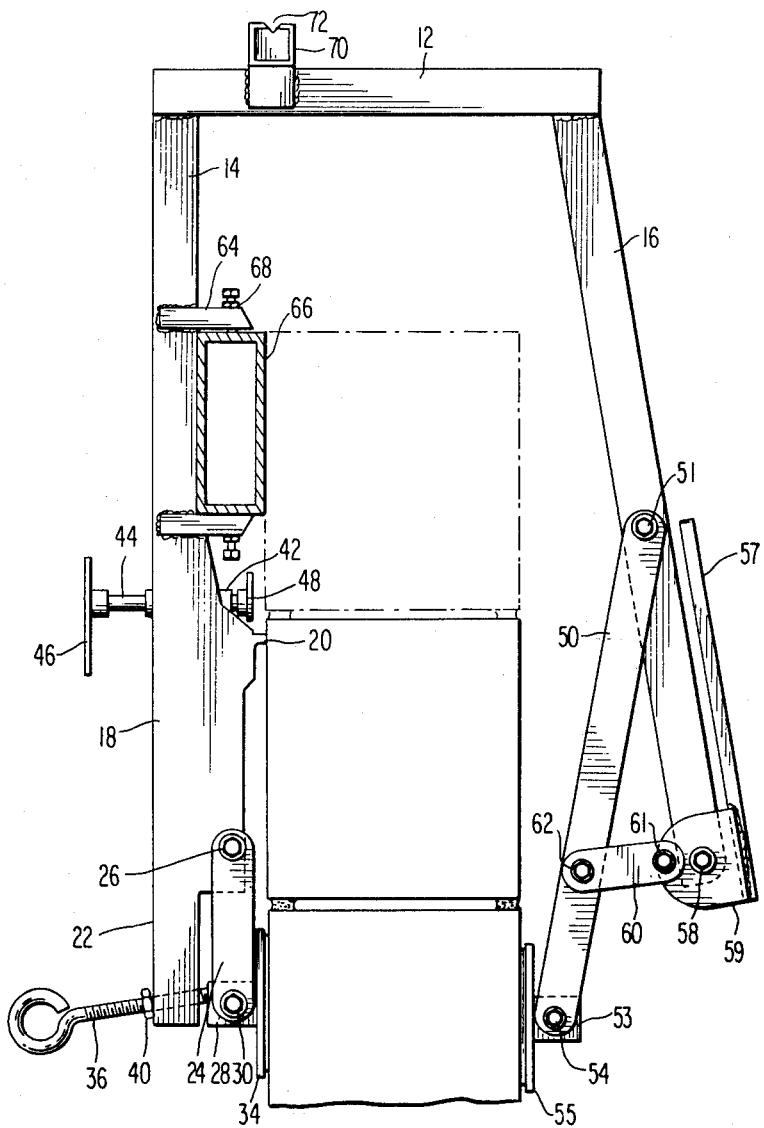
FIG. 4 is a side elevational view of the guide unit positioned on the supporting member which is clamped upon a block of a previously laid row of a masonry unit.

The leg 14 is provided with a pair of vertically spaced supporting members 64, which are adapted to receive therebetween an elongated guide unit or board member 66, FIG. 4. The guide unit or board member 66, is of a prescribed size, and is positioned between the supporting members 64 and in abutting relation with the inner surface of the depending leg 14, with said guide unit retained in said position by threaded set screw 68 carried by the support members 64. The guide unit or board member 66 is of a thickness slightly greater than the protruding length of the supporting members 64, FIG. 4, and said guide unit or board member is preferably formed of magnesium and due to its light weight, may be readily mounted on the support 64, and moved in conjunction with the frame 10 from one location to another on a masonry structure. The magnesium material enables the guide unit or board member to withstand rough usage that would be occasioned by the bricks or blocks being disposed in abutting engagement with said guide unit or board member 66, during the laying of a row or course of bricks or blocks and also in serving as a guide unit for maintaining a mortar applicator in proper alignment as said applicator is being moved down or along a course or row of bricks or blocks for the purpose of depositing beads of mortar thereon.

The top member 12 of the supporting frame 10 is provided with an upwardly extending segment 70 that has a notch 72 formed in its upper edge which is adapted to receive and support a convention cord guide line, not shown. It is to be noted that the notch 72 and the inner face of the guide unit or board member 66 lie in approximately the same vertical plane. Thus said elements or surfaces tend to act as a check means to insure that the supporting frame is properly positioned upon the course or row of bricks or blocks to wherein the outer face of the bricks or blocks will be in proper vertical relationship with one another throughout the various courses or rows in the masonry unit.

In the use of the present device in the building of a wall or similar structure, a concrete footing or foundation slab is formed in the customary manner and upon this slab or foundation is laid the first row or course of blocks or bricks. The first row or course of blocks or bricks is laid using a conventional guide or plumb line and extra care should be exercised in laying said first row to make certain that the tops of all of the blocks or bricks are flush and further, that all blocks or bricks butt together evenly as the care and manner in which the row or course is formed, will have a bearing upon the construction of the wall as regards the alignment in both the vertical and horizontal planes.

Once the first row or course of bricks or blocks has been laid, the supporting frame 10, with the shoe or pad elements 34 and 55 in their released position, FIG. 1, may be positioned over said course or row of bricks or blocks so as to straddle same. The supporting frame 10 is lowered until lip 20 engages the outer face of a brick or block in the previously laid row or course at which time the rod 36 maybe rotated for moving the pad 34 either into or out of engagement with a brick so that the lip 20 acts as a pivot point in properly aligning the frame 10 with the previously laid rows of bricks or blocks. During the alignment of the frame 10, the handle 46 maybe pushed inwardly to extend the washer 48 outwardly to wherein it will engage the top surface of said brick or block to facilitate the raising of the frame 10 wherein the notch 72 of the segment 70 will move into engagement with a conventional cord guide line, not shown, which had been previously erected in a customary manner. The rotation of the washer 48 will cause the notch 72 to move up into engagement with the cord guide or down and away from it until the frame 10 is properly positioned on the bricks or blocks with respect to the cord guide. When the frame has been properly positioned the threaded rod 46 is rotated to move the pad 34 into engagement with the face of the brick or block and the lever 57 is moved towards the leg 16 to cause the pad 55 to engage the other face of the brick or block. The movement of the lever 57 towards the leg 16 causes the wing elements 59 to move about rod 58 and at the same time move the links 60 about the pintles 62 so that the pins 61 in the ends of the links 60 move beyond dead center for holding lever 57 against the leg 16, FIG. 4.

Figure 6:
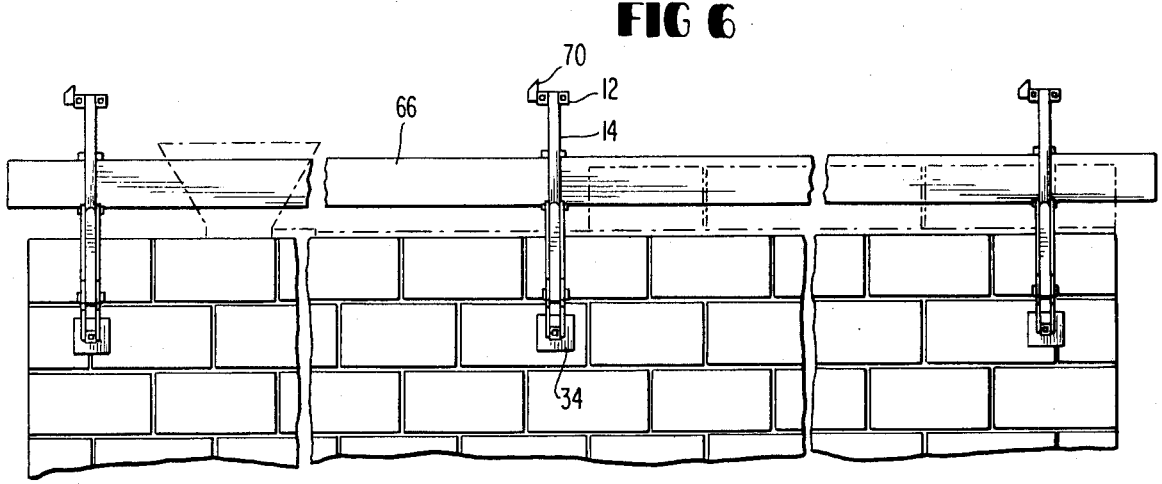
FIG. 6 is a side elevational view showing the guide unit and a portion of the supporting member positioned upon a masonry wall.

Once the supporting frame 10 has been clamped upon a row or course of bricks or blocks, the guide unit or board member 66 may then be positioned upon the support members 64. It should be borne in mind that the guide unit or board member 66 is mounted in two or more supporting frame units 10 at the same time as illustrated in FIG. 6. With the guide unit or board member 66 mounted on the supporting members 64, and in abutting engagement with the inner face of the leg 14, the set screws 68 are then tightened so as to engage the top and bottom faces of the guide unit or board member to properly position and maintain same upon said supporting members. With the supporting frame units 10 so positioned upon a previously laid row or course of bricks or blocks, and with the guide unit or board member 66 secured to the supports 64, a mortar laying hopper device such as illustrated in dotted lines in FIG. 6 or as shown in applicant's copending application Ser. No. 113,325 filed Jan. 18, 1980, may then be drawn along the upper surface of the last laid row or course of bricks or blocks for the purpose of depositing beads of mortar on the upper surface of said bricks or blocks adjacent their inner and outer edges. Once the mortar has been placed upon the upper surface of the bricks or blocks, another course of bricks or blocks may then be readily positioned, upon the newly laid beads or ribbons of mortar with the outer face of the bricks or blocks being brought into engagement with the inner face of the guide unit or board member 66. This will enable the blocks or bricks to be laid in a very rapid manner and with the assurance that the newly laid course or row of bricks or blocks will be in proper vertical alignment or arrangement with previously laid rows or courses of bricks or blocks.

When the newly laid row or course of bricks or blocks reaches the end of the guide unit or board member 66, the supporting frames 10 may be removed from the course or row of blocks upon which it was initially clamped by simply pivoting the lever 52 about the pin 54, so as to withdraw the pad 50 from the inner face of the row of bricks or blocks whereby the supporting frame 10 may be moved to a new location by simply grasping the upper or top member 12 and repositioning said frame at a new location on the wall. This movement of the supporting frame will enable the guide unit or board member 66 to be retained on the supporting members 64, if all of the supporting frames which are supporting or carrying the guide unit or board member are moved at the same time and this can readily be carried out by several operators.

Although the foregoing description is necessarily of a detailed character, in order that the invention may be completely set forth, it is to be understood that the specific terminology is not intended to be restrictive or confining, and that various rearrangements of parts and modifications detail, may be resorted to, without departing from the scope or spirit of the invention as herein claimed.

We claim:

1. A device for facilitating the laying of courses of masonry units to form a wall or the like having inner and outer faces comprising at least a pair of spaced supporting units arranged to straddle a previously laid course of masonry units, said supporting units each constituting a rigid unitary structure including a top section having secured to one end thereof a first depending leg in a plane normal to the plane of the top section and a second depending leg secured to the other end of the top section at an obtuse angle with respect to the top section, each of said legs having pivotally connected thereto adjacent its lower end a shoe element, actuating means carried by the ends of said legs for moving said shoe elements into engagement with inner and outer faces of the wall for positioning said supporting units on the wall, said first leg having a pair of support members secured thereto in spaced relation to one another, an elongated rigid guide member interposed between and secured to said support members, said guide member locating the course for masonry units to be laid against it and upon previously laid course of masonry units.

2. A device as set forth in claim 1 wherein said support members protrude from said first leg towards said second leg and said guide member is of a thickness slightly greater than the protruding length of said support members.

3. A device as set forth in claim 2 wherein said guide member is metallic.

4. A device as set forth in claim 1 wherein said shoe elements are provided with pads on one face thereof for engaging a masonry unit and with a boss on the other face pivotally connected to said legs.

5. A device as set forth in claim 4 wherein one of said shoe elements has a threaded member connected thereto which engages a threaded aperture in said leg for adjustably positioning said shoe element with respect to said leg.

6. A device as set forth in claim 1 wherein one of said shoe elements is actuated by links connected to a leg segment and a lever pivoted on a leg for moving said link beyond dead center to urge said shoe element into engagement with a masonry unit.

7. A device as set forth in claim 1 wherein said first depending leg is provided with a tubular sleeve subjacent said guide member, a rod slidably mounted in said sleeve, a handle on one end of said rod and a washer secured to the other end in an offset relation, said washer projecting beyond said leg upon the actuation of said handle and engaging the top surface of a masonry unit, said washer raising or lowering said supporting unit with respect to said masonry unit upon the rotation of said handle.

8. A device as set forth in claim 7 wherein said top section is provided with a notched segment which is raised or lowered upon the rotation of said handle for engaging a guide line.

9. A device as set forth in claim 1 wherein said top section comprises a pair of spaced elongated square shaped segments with said leg members interposed between said square shaped segments and secured thereto.

* * * * *